United States Patent
Wang et al.

(10) Patent No.: US 9,449,245 B2
(45) Date of Patent: Sep. 20, 2016

(54) METHOD AND DEVICE FOR DETECTING STRAIGHT LINE

(71) Applicant: Xiaomi Inc., Beijing (CN)

(72) Inventors: Baichao Wang, Beijing (CN); Lin Wang, Beijing (CN); Zhijun Chen, Beijing (CN)

(73) Assignee: XIAOMI INC., Haidian District, Beijing (CN)

(*) Notice: Subject to any disclaimer, the term of this patent is extended or adjusted under 35 U.S.C. 154(b) by 18 days.

(21) Appl. No.: 14/526,521

(22) Filed: Oct. 29, 2014

(65) Prior Publication Data

US 2015/0242699 A1    Aug. 27, 2015

Related U.S. Application Data

(63) Continuation of application No. PCT/CN2014/084460, filed on Aug. 15, 2014.

(30) Foreign Application Priority Data

Feb. 22, 2014    (CN) .......................... 2014 1 0063121

(51) Int. Cl.
*G06K 9/00*    (2006.01)
*G06K 9/46*    (2006.01)

(52) U.S. Cl.
CPC ........... *G06K 9/4604* (2013.01); *G06K 9/4609* (2013.01); *G06K 9/4642* (2013.01)

(58) Field of Classification Search
CPC .... G06K 9/4642; G06K 9/4604; G06K 9/46; G06K 9/6212; G01B 11/25; G06T 5/005

USPC .......................................................... 382/170
See application file for complete search history.

(56) References Cited

U.S. PATENT DOCUMENTS 9,014,480 B2 *   4/2015   Baheti .................. G06K 9/4661
                                                                        382/194
2003/0228057 A1    12/2003   Paquette
(Continued)

FOREIGN PATENT DOCUMENTS

CN    102156882 A    8/2011
CN    102663395 A    9/2012
(Continued)

OTHER PUBLICATIONS

"International Search Report for PCT/CN2014/084460".
(Continued)

*Primary Examiner* — Ali Bayat
(74) *Attorney, Agent, or Firm* — Jun He Law Offices P.C.; James J. Zhu

(57) ABSTRACT

The present disclosure relates to a method and a device for detecting a straight line. The method includes: acquiring a Histogram of Oriented Gradients (HOG) feature set for each respective pixel point in an image, wherein the HOG feature set is configured to reflect straight line characteristics of a localized portion where the pixel point locates; determining at least one candidate direction of a straight line to be detected according to the HOG feature sets of the respective pixel points; and detecting a direction and a position of the straight line precisely according to the candidate direction. The present disclosure efficiently avoids the errors caused by binarization, and increases the accuracy of the detection of straight line.

17 Claims, 5 Drawing Sheets

(56) References Cited

U.S. PATENT DOCUMENTS

| | | | |
|---|---|---|---|
| 2011/0202178 A1 | 8/2011 | Zhen et al. | |
| 2012/0105868 A1* | 5/2012 | Nomura | G01B 11/25 356/610 |
| 2012/0155745 A1 | 6/2012 | Park et al. | |
| 2013/0201358 A1 | 8/2013 | Sun | |
| 2013/0335575 A1 | 12/2013 | Tsin et al. | |
| 2014/0270479 A1* | 9/2014 | Berestov | G06T 7/0085 382/154 |
| 2015/0161476 A1* | 6/2015 | Kurz | G06K 9/4671 382/190 |

FOREIGN PATENT DOCUMENTS

| | | |
|---|---|---|
| CN | 102750703 A | 10/2012 |
| CN | 103308056 A | 9/2013 |
| CN | 103383733 A | 11/2013 |
| CN | 103914830 A | 7/2014 |
| JP | 10-275213 A | 10/1998 |

OTHER PUBLICATIONS

Zhang Xiaohu et al. "A new line boundary detection algorithm based on histogram of gradient. s direction" Optical Technique, vol. 32 No. 6 (Nov. 2006).

Yu Xin-rui et al. "Subpixle location detecting of line feature in digital image" Optical Tech nique, vol. 30 No. 2 (Mar. 2004).

Satzoda R K et al: "Gradient agnle histograms for efficient linear hough transform", Image Processing (ICIP), Nov. 7, 2009, pp. 3273-3276, XP031628607.

Dalal N et al: "Histograms of oriented gradients for human detection", Proceedings / 2005 IEEE Computer Society Conference on Computer Vision and Pattern Recognition, Jun. 25, 2005, pp. 886-893 vol. 1, XP031330347.

Phillip A Mlsna et al: "4.13—Gradient and Laplacian Edge Detection", 2005, Handbook of Image and Video Processing (Second Edition), pp. 535-553, XP009184897.

Chung K L et al: "New orientation-based elimination approach for accurate line-detection", Pattern Recognition Letters, vol. 31, No. 1, Jan. 2010, pp. 11-19, XP026741889.

Brian Burns J et al: "Extracting straight Lines", IEEE Transactions on Pattern Analysis and Machine Intelligence, IEEE Computer Society, USA, vol. 31, No. 4, Jul. 1986, pp. 425-455, XP011242942.

Shule Ge et al: "An airport runway centerline location method for one-off aerial imaging system", Proceedings of SPIE, vol. 7850, Nov. 3, 2010, pp. 785010-785010-9, XP055217779.

Jiann-Yeou Rau et al: "Fast Straight Lines Detection Using Hough Transform with Principal Axis Analysis", J. Photogrammetry and Remote Sensing, vol. 8, No. 1, Jan. 2003, pp. 15-34, XP55217641.

Chunsun Zhang et al: "Effective Seperation of Trees and Buildings for Automated Building Detection", Proceedings of the 32nd Asian Conference of Remote Sensing, Oct. 3, 2011, XP055196543.

Jung C R et al: "Rectangle detection based on a windowed hough transform", Computer Graphics and Image Processing, Oct. 17, 2004, pp. 113-120, XP010737732.

Extended European search report of 15275034.5.

Chen Jun-jie et al.: "The Improved Approach of Straight Line Segments Detection Based on Hough Transform" Microcomputer information, vol. 26, No. 7-3; p. 211-213.

Qin Xun-hui et al.: "A Line Segments Detection Algorithm Based on Grad" Acta Photonica Sinica, Feb. 2012; vol. 41, No. 2; p. 205-209.

R.K. Satzoda et al. "Gradient Angle Histograms for Efficient Linear Hough Transform"; p. 3273-3276.

Kuo-Liang Chung et al. "New orientation-based elimination approach for accurate line-detection"; Pattern Recogonition Letters (2010) 11-19.

Navneet Dalal et al. "Histograms of Oriented Gradients for Human Detection"; Proceedings of the 2005 IEEE Computer Society Conference on Computer Vision and Pattern Recognition.

* cited by examiner

METHOD AND DEVICE FOR DETECTING STRAIGHT LINE

CROSS REFERENCE TO RELATED APPLICATION

This application is a Continuation of International Application No. PCT/CN2014/084460, filed on Aug. 15, 2014, which is based upon and claims priority to Chinese Patent Application No. 201410063121.0, filed on Feb. 22, 2014, the entire contents of which are incorporated herein by reference.

TECHNICAL FIELD

The present disclosure generally relates to the field of image processing, and more particularly, to a method and a device for detecting a straight line.

BACKGROUND

The detection of straight lines and geometrical shapes is an important subject in the field of image processing. In a real scene of an image, given that there are a large number of straight lines and geometrical shapes, it will be of great importance in image processing to realize methods for quickly and accurately detecting the straight lines and the geometrical shapes.

Generally, the method for detecting the geometrical shapes is derived from the method for detecting the straight lines. In the related art, the method of Hough transform is usually used for detecting the straight lines. The Hough transform defines a parameter space, which has a dual relationship with an image, such that one straight line in the image corresponds to one point in the parameter space, and one point in the image corresponds to one sine wave in the parameter space. From the above corresponding relationship, it is known that several collinear points on one straight line in the image correspond to several sine waves, which intersect at the same point in the parameter space. Based on this, a problem of detecting a straight line having maximum collinear points in the image is changed into a problem of detecting a peak point at which the most number of sine waves intersect at one point in the parameter space, and the straight line corresponding to the peak point is the straight line to be detected in the image.

In the above method for detecting the straight lines based on the Hough transform, given that several collinear points need to be sampled in the image, therefore the image needs to be binarized at first, namely, a binary image composed of black pixel points and white pixel points is obtained, and then several collinear points are sampled in the binary image. However, binarization of the image is sensitive to parameters, and it is only applicable for detecting a straight line, which has strong edge strength, i.e. the straight line having a gray value, which obviously differs from gray values of other regions in the image. Moreover, when the edge strength of the straight line is weak or there are noise interferences, then the straight line will be broken, and accuracy of the detection results will be significantly influenced.

SUMMARY

Accordingly, embodiments of the present disclosure provide a method and a device for detecting a straight line. The technical solutions are as follows.

According to a first aspect of the embodiments of the present disclosure, there is provided a method for detecting a straight line, including: acquiring a Histogram of Oriented Gradients (HOG) feature set for each respective pixel point in an image, wherein the HOG feature set is configured to reflect straight line characteristics of a localized portion where the pixel point locates; determining at least one candidate direction of a straight line to be detected according to the HOG feature sets of the respective pixel points; and detecting a direction and a position of the straight line precisely according to the candidate direction.

According to a second aspect of the embodiments of the present disclosure, there is provided a device for detecting a straight line, including: a processor; and a memory for storing instructions executable by the processor, for performing: acquiring a Histogram of Oriented Gradients (HOG) feature set for each respective pixel point in an image, wherein the HOG feature set is configured to reflect straight line characteristics of a localized portion where the pixel point locates; determining at least one candidate direction of a straight line to be detected according to the HOG feature sets of the respective pixel points; and detecting a direction and a position of the straight line precisely according to the candidate direction.

According to a third aspect of the embodiments of the present disclosure, there is provided a non-transitory readable storage medium comprising instructions, executable by a processor in a device, for performing a method for detecting a straight line, wherein the method comprises: acquiring a Histogram of Oriented Gradients (HOG) feature set for each respective pixel point in an image, wherein the HOG feature set is configured to reflect straight line characteristics of a localized portion where the pixel point locates; determining at least one candidate direction of a straight line to be detected according to the HOG feature sets of the respective pixel points; and detecting a direction and a position of the straight line precisely according to the candidate direction.

In conclusion, the problem in the related art that the method for detecting the straight line may cause the straight line to be broken and the detection result to be inaccurate when the edge strength is weak or when there are noise interferences is solved, by acquiring the HOG feature set of each respective pixel point in the image, determining the at least one candidate direction of the straight line to be detected according to the HOG feature sets of the respective pixel points, and then determining the direction and precise position of the straight line to be detected according to the candidate direction, wherein the HOG feature set is configured to reflect the straight line characteristics of the localized portion where the pixel point locates. Compared with the related method for detecting a straight line in the Background, the method for detecting the straight line provided by the present embodiment neither uses Hough Transform nor binarizes the image, thus avoids the errors caused by binarization, and increases the accuracy of the detection of straight line.

It is to be understood that both the foregoing general description and the following detailed description are exemplary only and are not restrictive of the present disclosure.

BRIEF DESCRIPTION OF THE DRAWINGS

The accompanying drawings herein, which are incorporated in and constitute a part of this specification, illustrate embodiments consistent with the invention and, together with the description, serve to explain the principles of the invention.

In order to clearly explain the embodiments of the present disclosure, hereinafter, the introduction to the drawings required to be used in the depiction of the embodiments will be given simply. It is apparent that the accompanying drawings only illustrate some of the embodiments of the present disclosure, and the person skilled in the art could obtain other drawings based on these drawings without inventive labor.

Specific embodiments in this disclosure have been shown by way of the foregoing drawings and are hereinafter described in detail. The figures and written description are not intended to limit the scope of the inventive concepts in any manner. Rather, they are provided to illustrate the inventive concepts to a person skilled in the art with reference to particular embodiments.

DETAILED DESCRIPTION

In order to make the purposes, technical solutions and advantages of the present disclosure more apparent, the present disclosure will be further described in detail with reference to the accompanying drawings. Obviously, the described embodiments are only a part of the embodiments of the present disclosure, not all the embodiments of the present disclosure. All the other embodiments acquired by those skilled in the art without inventive labor based on the embodiments of the present application fall into the protection scope of the present disclosure.

Firstly, it is to be explained that a device, such as an electronic device involved in the present disclosure may be a cell phone, a tablet PC, an e-book reader, a MP3 (Moving Picture Experts Group Audio Layer III) player, a MP4 (Moving Picture Experts Group Audio Layer IV) player, a portable laptop computer, a desktop computer and the like. Meanwhile, the electronic device includes an image collecting component such as a camera.

Figure 1:
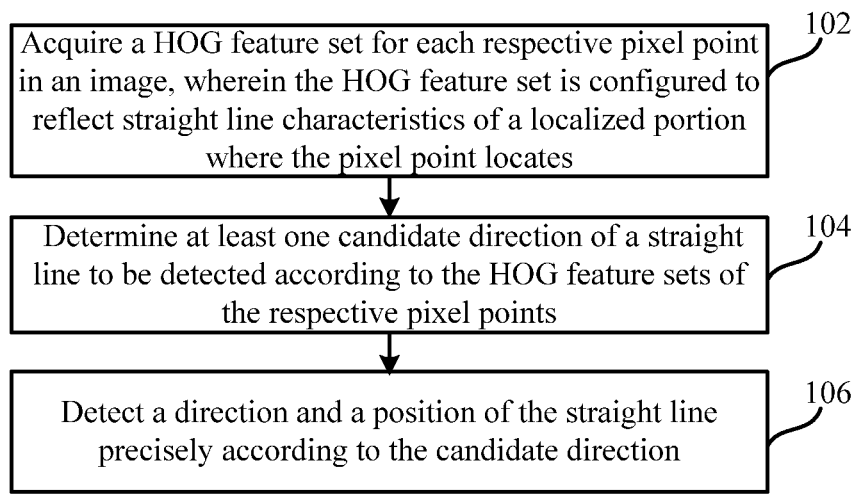
FIG. 1 is a flow chart illustrating a method for detecting a straight line, according to an exemplary embodiment.

FIG. 1 is a flow chart illustrating a method for detecting a straight line, according to an exemplary embodiment. The present embodiment illustrates the method for detecting the straight line as to be performed by the electronic device. The method for detecting the straight line may include the following steps.

In step 102, a Histogram of Oriented Gradients (HOG) feature set of each respective pixel point in an image is acquired, wherein the HOG feature set is configured to reflect straight line characteristics of a localized portion where the pixel point locates.

In step 104, at least one candidate direction of a straight line to be detected is determined according to the HOG feature sets of the respective pixel points.

In step 106, a direction and a position of the straight line to be detected are detected precisely according to the candidate direction.

In conclusion, the method for detecting the straight line provided by the present embodiment includes acquiring the HOG feature set of each respective pixel point in the image, determining the at least one candidate direction of the straight line to be detected according to the HOG feature sets of the respective pixel points, and then determining the direction and precise position of the straight line to be detected according to the candidate direction, wherein the HOG feature set is configured to reflect the straight line characteristics of the localized portion where the pixel point locates. The problem in the related art that the method for detecting the straight line may cause the straight line to be broken and the detection result to be inaccurate when the edge strength is weak or when there are noise interferences is solved. Compared with the related method for detecting a straight line in the Background, the method for detecting the straight line provided by the present embodiment neither uses Hough Transform nor binarizes the image, thus avoids the errors caused by binarization, and increases the accuracy of the detection of straight line.

Figure 2A:
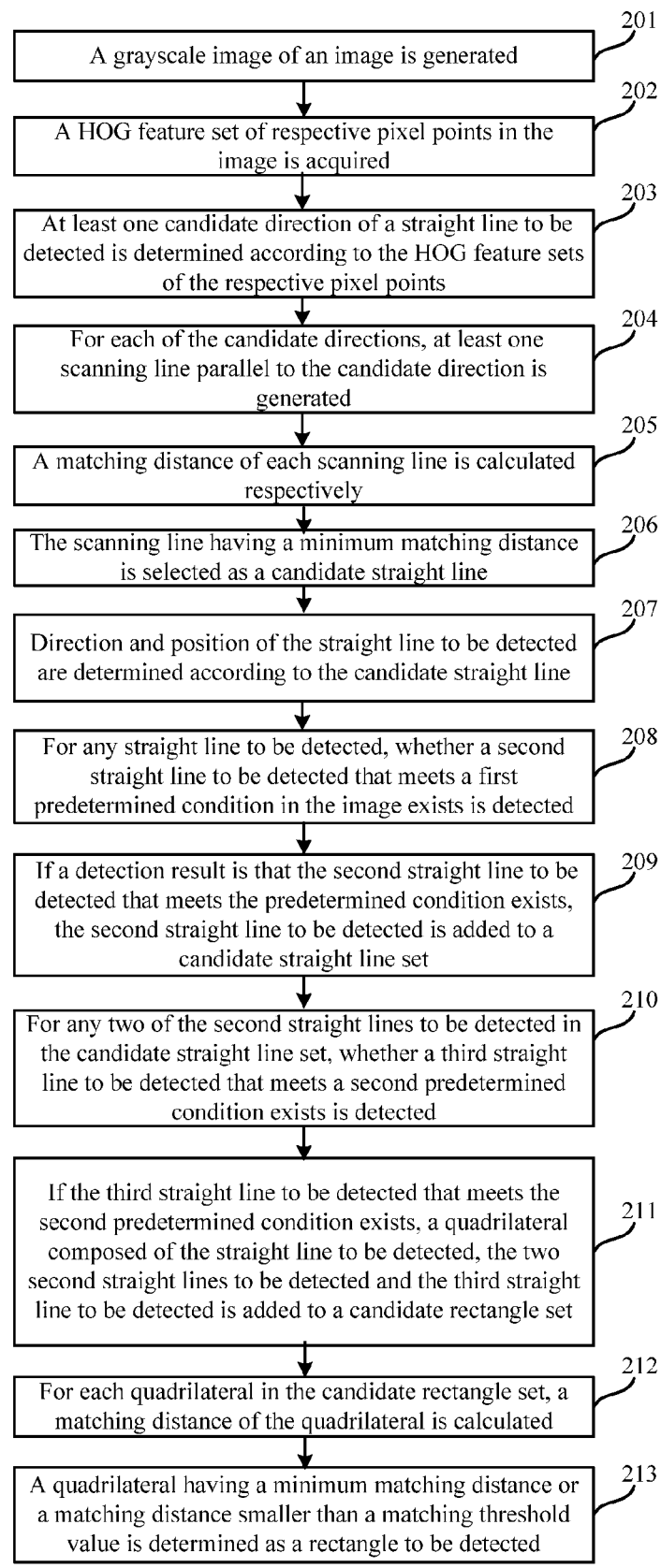
FIG. 2A is a flow chart illustrating a method for detecting a straight line, according to another exemplary embodiment.

FIG. 2A is a flow chart illustrating a method for detecting a straight line, according to another exemplary embodiment. As illustrated in FIG. 2A, the method for detecting the straight line may include the following steps.

In step 201, a grayscale image of an image is generated.

Before the straight line is detected, the electronic device grayscales a collected image at first to generate a grayscale image of the image. The grayscale is classified into 256 levels, a gray value of any pixel point (i, j) is $I(i, j) \in [0, 255]$.

In step 202, a HOG feature set of respective pixel points in the image is acquired.

The electronic device acquires a HOG feature set of each respective pixel point in the image, wherein the HOG feature set is configured to reflect straight line characteristics of a localized portion where the pixel point locates.

This step may include the following two sub-steps.

Firstly, for each pixel point (i, j) of the respective pixel points, an oriented gradient set g(i, j) of the pixel point is calculated.

For each pixel point (i, j) of the respective pixel points, the electronic device calculates an oriented gradient set g(i, j) of the pixel point. The oriented gradient set of one pixel point includes oriented gradient values of the pixel point in K directions, and an oriented gradient value of the pixel point in any direction refers to an absolute value of a difference between a gray value of the pixel point and a gray value of an adjacent pixel point in the direction, wherein $K \geq 2$. A value of K is preset according to actual requirements, the greater the value of K is, the more precise the result of the detection of the straight line is. In order to reduce an amount of calculation, the value of K is 4 or 8 in a normal circumstance.

Figure 2B:
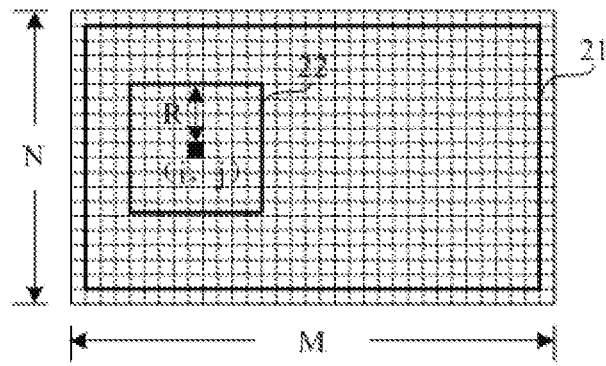
FIG. 2B is a schematic view illustrating a feature calculating process of a method for detecting a straight line, according to another exemplary embodiment.

Referring to FIG. 2B, suppose there is an image I, a size of the image I is M*N (M and N respectively represent a number of pixel points in a horizontal direction and a vertical direction of the image I), wherein $M \geq 1$, $N \geq 1$. For any pixel point (i, j) in the image I, $i \in [0, M]$, $j \in [0, N]$, and an oriented gradient set corresponding to the pixel point is g (i, j).

Meanwhile, it is assumed that K=4, the 4 directions are respectively directions at angles of 0°, 45°, 90° and 135° to the horizontal direction, and oriented gradient values of the pixel point (i, j) in the 4 directions are respectively recorded as $g_0$ (i, j), $g_{45}$ (i, j), $g_{90}$ (i, j) and $g_{135}$ (i, j). Then:

$$g(i,j)=\{g_0(i,j),g_{45}(i,j),g_{90}(i,j),g_{135}(i,j)\}, \text{wherein}$$

$$g_0(i,j)=|I(i+1,j)-I(i,j)|;$$

$$g_{45}(i,j)=|I(i-1,j-1)-I(i-j)|;$$

$$g_{90}(i,j)=|I(i,j-1)-I(i,j)|;$$

$$g_{135}(i,j)=|I(i+1,j-1)-I(i,j)|;$$

I(i, j) represents the gray value of the pixel point (i, j), I(i, j) ∈[0, 255].

In practical applications, boundary pixel points in the image may not be taken into consideration, wherein the boundary pixel points refer to pixel points at four edges of the periphery of the image, for example, the pixel points contained in the region outside a black frame 21 in FIG. 2B.

Secondly, a HOG feature set h(i, j) of the pixel point is calculated according to the oriented gradient set g(i, j) of the pixel point.

The electronic device calculates the HOG feature set h(i, j) of the pixel point according to the oriented gradient set g(i, j) of the pixel point.

Firstly, it is to be understood that if there is one straight line existing in the image, the gray values of the respective pixel points in a direction of the straight line change slowly or do not change, but the gray values of the respective pixel points suddenly change in a direction perpendicular to the direction of the straight line. By using this characteristics, after the oriented gradient set g (i, j) of the pixel points is obtained, the HOG feature set h(i, j) of the pixel point is calculated.

The HOG feature set h(i, j) of the pixel pint reflects straight line characteristics of a localized portion where the pixel point locates, and the straight line characteristics include whether a straight line to be detected exists and a first kind or all of the two kinds of approximate directions of the straight line to be detected within the localized portion where the pixel point locates. The approximate direction of the straight line to be detected refers to the direction that the straight line to be detected approaches. For example, if the direction that the straight line to be detected approaches is in a neighborhood range of 45°, the approximate direction of the straight line to be detected is 45°.

The above-described second sub-step may further include the following several sub-steps.

(1) Local gradient values $\overline{h_k(i,j)}$ of the pixel point in the K directions are respectively calculated.

The electronic device respectively calculates the local gradient values $\overline{h_k(i,j)}$ of the pixel point in the K directions, and k represents a direction. A local gradient value $\overline{h_k(i,j)}$ of the pixel point (i, j) in k direction is equal to a sum of oriented gradient values of all pixel points in the k direction within the localized portion where the pixel point locates. In the present embodiment, $$\overline{h_k(i,j)}=\Sigma_{i'=i-R}^{i+R}\Sigma_{j'=j-R}^{j+R}g_k(i',j'), k\in\{0,45,90,135\}.$$

In this case, R is an average radius, and a value of R is preset according to actual requirements, for example, R=4. Referring to FIG. 2B, the value of R also decides a range of the localized portion 22 where the pixel point (i, j) locates, and a number of pixel points contained in the localized portion 22 where the pixel point (i, j) locates is equal to (2R+1)*(2R+1). For example, when R=4, the range of the localized portion 22 where the pixel point (i, j) locates is a region composed of 9*9=81 pixel points centering around the pixel point (i, j).

(2) An average gradient value $h_{norm}$ (i, j) of the pixel point is calculated.

The electronic device calculates the average gradient value $h_{norm}$ (i, j) of the pixel point. The average gradient value $h_{norm}$ (i, j) is equal to the square root of the sum of the squares (SRSS) of the respective local gradient values $\overline{h_k(i,j)}$ of the pixel point. In the present embodiment, $$h_{norm}(i,j)=\sqrt{\Sigma_{l\in\{0,45,90,135\}}\overline{h_l(i,j)}^2}.$$

The local gradient value $\overline{h_k(i,j)}$ is divided by the average gradient value $h_{norm}(i,j)$ to obtain a HOG feature $h_k(i, j)$ of the pixel point in the k direction.

The electronic device divides the local gradient value $\overline{h_k(i,j)}$ by the average gradient value $h_{norm}(i,j)$ to obtain the HOG feature $h_k(i, j)$ of the pixel point in the k direction. In the present embodiment, $$h_k(i,j)=\overline{h_k(i,j)}/h_{norm}(i,j), k\in\{0,45,90,135\}.$$

(4) A set of HOG features in the K directions is determined as the HOG feature set h(i, j) of the pixel point.

The electronic device determines the set of HOG features in the K directions as the HOG feature set h(i, j) of the pixel point. The HOG feature set of the pixel point (i, j) is h(i, j), and the HOG feature set h(i, j) includes HOG features of the pixel point (i, j) in the K directions. In the present embodiment, $$h(i,j)=\{h_0(i,j),h_{45}(i,j),h_{90}(i,j),h_{135}(i,j)\}.$$

As can be seen, the greater the value of $h_k(i, j)$ is, the more obvious, as indicated, the changes of gray values of the respective pixel points in the k direction are, and sudden changes in the gray values are very likely to exist. Based on this, it can be speculated that a direction perpendicular to the k direction is the approximate direction of the straight line to be detected.

It is to be explained that, in order to reduce interferences of factors such as noises or light illumination and also the amount of calculation, after the average gradient value $h_{norm}$ (i, j) of the pixel point is calculated, whether the average gradient value $h_{norm}$ (i, j) is smaller than a predetermined average value $T_{norm}$ may also be detected. If a detection result is that the average gradient value $h_{norm}$ (i, j) is smaller than the predetermined average value $T_{norm}$, the respective HOG features in the HOG feature set h(i, j) of the pixel point are set to be zero. Because the predetermined average value $T_{norm}$ reflects an overall gradient state of the localized portion where the pixel point locates in various directions, and when the average gradient value $h_{norm}$ (i, j) is rather small, it means that the edge strength within the localized portion is weak, the change of the gray values between adjacent pixel points may be caused by the factors such as noises or light illumination, rather than by an existed straight line to be detected within the localized portion. Accordingly, when the average gradient value $h_{norm}$ (i, j) is smaller than the predetermined average value $T_{norm}$, the respective HOG features in the HOG feature set h(i, j) of the pixel point are set to be zero.

In step 203, at least one candidate direction of the straight line to be detected is determined according to the HOG feature sets of the respective pixel points.

The electronic device determines at least one candidate direction of the straight line to be detected according to the HOG feature sets of the respective pixel points.

This step may include the following several sub-steps.

Firstly, for each respective pixel point, a direction corresponding to a HOG feature having a maximum value in the HOG feature set is selected as a main direction of the localized portion where the pixel point locates.

In step 202, it has been introduced that the greater the value of $h_k(i, j)$ is, the more obvious, as indicated, the changes of the gray values of the respective pixel points in the k direction are, and sudden changes in the gray values may be very likely. Based on this, it can be speculated that the direction perpendicular to the k direction is the approximate direction of the straight line to be detected.

Thus, the electronic device selects the direction corresponding to the HOG feature having the maximum value in the HOG feature set $h(i, j)$ as the main direction of the localized portion where the pixel point locates, and the main direction is proximately perpendicular to the direction of the straight line in the localized portion.

Secondly, statistics of vote numbers of the main directions of the localized portions where the respective pixel points locate in the K directions are analyzed.

After determining the main direction of the localized portion where each pixel point in the image locates, the electronic device analyzes statistics of the vote number of the main directions of the localized portions where the respective pixel points locate in the K directions for the whole graph.

For example, the statistical result may include the followings: the number of pixel point whose main directions of the localized portion are 0° is "a", the number of pixel point whose main directions of the localized portion are 45° is "b", the number of pixel point whose main directions of the localized portion are 90° is "c", the number of pixel point whose main directions of the localized portion are 135° is "d". Herein a, b, c and d respectively represent vote numbers in four directions after statistics of the integral graph is analyzed, and it is assumed that b>a>c>d.

Thirdly, a direction perpendicular to a direction having a vote number that exceeds a vote threshold is selected as the candidate directions of the straight line to be detected.

After analyzing statistics of vote numbers of the main directions of the localized portions where the respective pixel points locate in the K directions, the electronic device detects whether the vote numbers in various directions are greater than the vote threshold. In practical applications, a value of the vote threshold may be set by an overall consideration of factors such as a size of the image, data processing capability of the electronic device and requirements for detection precision of the straight line.

Thereinafter, the electronic device selects at least one direction having the vote number that exceeds the vote threshold, and uses a direction perpendicular to the selected direction as the candidate direction of the straight line to be detected. Since the direction having the vote number that exceeds the vote threshold reflects a main direction of one of the respective localized portions in the image, and the main directions of the respective localized portions are proximately perpendicular to the straight line in the image, thus it is required to select the direction perpendicular to the direction having the vote number that exceeds the vote threshold as the candidate direction of the straight line to be detected.

After this step, in normal circumstances, one and/or two directions may be selected from the K directions as the candidate directions of the straight line to be detected. In the following steps, the electronic device finally determines the direction and the position of the straight line to be detected by calculating and analyzing in a coarse-scale and a fine-scale.

In the present embodiment, it is assumed that b>the vote threshold>a>c>d, and the main direction corresponding to the vote number b is 45°, so the direction of 135° is selected as the candidate direction of the straight line to be detected.

In step 204, for each of the candidate directions, at least one scan line paralleled to the candidate direction is generated.

Figure 2C:
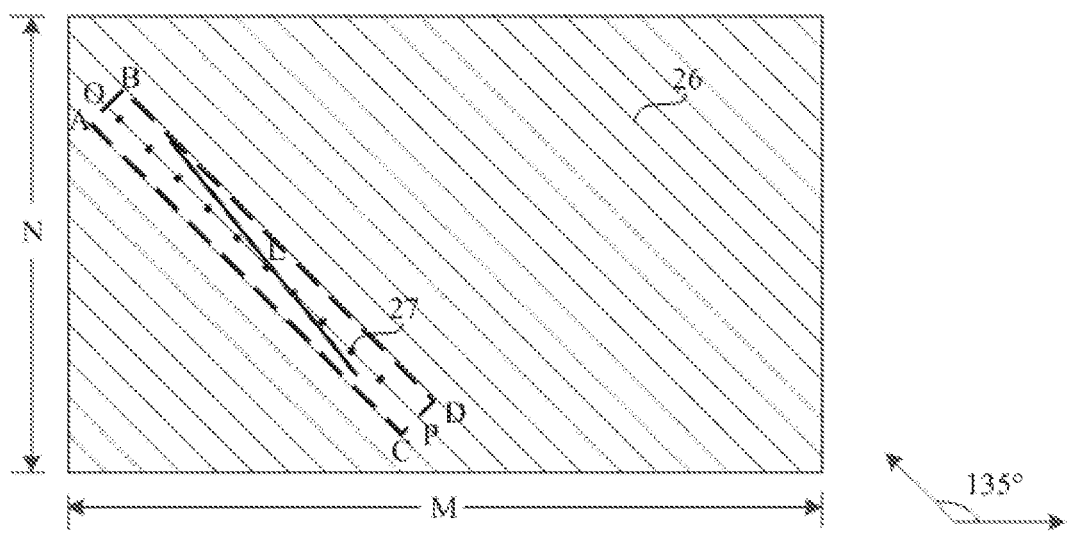
FIG. 2C is a schematic view illustrating a direct selection process of a method for detecting a straight line, according to another exemplary embodiment.

For each of the candidate directions, the electronic device generates at least one scan line paralleled to the candidate direction. Referring to FIG. 2C, a straight line L in an image having a size of M*N is shown in FIG. 2C. After step 201 through step 203, it can be determined that the candidate direction of the straight line to be detected is 135°. Scan lines 26 in the direction of 135° are full of the entire image, a distance between adjacent scan lines 26 may be set by an overall consideration of factors such as the size of the image, the data processing probability of the electronic device and the requirements for detection precision of the straight line.

In step 205, a matching distance of each scan line is respectively calculated.

The electronic device respectively calculates the matching distance of each scan line, and the matching distance of the scan line is configured to reflect a degree of proximity of the scan line to the straight line to be detected. For example, this step includes the following several sub-steps.

Firstly, for each scan line, n sample points are acquired by sampling on the scan line, and n≥1.

For each scan line, the electronic device acquires n sample points by sampling on the scan line, and n≥1. Alternatively, the electronic device acquires n sample points by evenly sampling each scan line. Referring to FIG. 2C, in the present embodiment, it is assumed that the electronic device acquires 10 sample points 27 by evenly sampling each scan line.

Secondly, a matching distance between a HOG feature set for each of the respective sample points and a template HOG feature set in a direction perpendicular to the candidate direction is calculated.

The electronic device calculates the matching distance between a HOG feature set for each of the respective sample points and the template HOG feature set in a direction perpendicular to the candidate direction. In the above-described step 202, the electronic device has acquired the HOG feature set of the respective pixel points in the image. At this time, the electronic device looks up and acquires the HOG feature set of the respective sample points from the HOG feature set of the respective pixel points according to the coordinates of the respective sample points.

The template HOG feature set is $Template_s$, $s \in \{0, 45, 90, 135\}$. In an exemplary implementation, $Template_0=\{1, 0, 0, 0\}$;
$Template_{45}=\{0, 1, 0, 0\}$;
$Template_{90}=\{0, 0, 1, 0\}$;
$Template_{135}=\{0, 0, 0, 1\}$.

In addition, in the present embodiment, it is assumed that the acquired n sample points are respectively $(x_0, y0)$, $(x_1, y_1)$, ..., $(x_i, y_i)$, ..., $(x_{n-1}, y_{n-1})$. Then, the matching distance between the HOG feature set of the sample point $(x_i, y_i)$ and the template HOG feature set in the direction perpendicular to the candidate direction is $dist[h(x_i, y_i), Template_s]=dist[h(x_i, y_i), Template_{45}]=|h_0(x_i, y_i)-0|+|h_{45}(x_i, y_i)-1|+|h_{90}(x_i, y_i)-0|+|h_{135}(x_i, y_i)-0|$.

Thirdly, matching distances of the n sample points are summed to obtain the matching distance of the scan line.

The electronic device sums the matching distances of the n sample points to obtain the matching distance of the scan line. The matching distance of the scan line is dist(scan line)=$\Sigma_{i=0}^{n-1}$dist(h($x_i$, $y_i$),Template$_s$).

In step 206, the scan line having a minimum matching distance is selected as a candidate straight line.

After calculating the matching distances of the respective scan lines, the electronic device selects the scan line having the minimum matching distance as the candidate straight line. Referring to FIG. 2C, in the present embodiment, it is assumed that the scan line that passes through two points O and P is the scan line having the minimum matching distance, i.e. the scan line that passes through the two points O and P is selected as the candidate straight line.

Referring to FIG. 2C, it can be seen that after the candidate straight line is determined, a proximate position of the straight line L to be detected in the image can be roughly determined. Then, the direction and the position of the straight line L to be detected in the image are finally determined by calculating and analyzing in fine scale in the following step 207.

In step 207, the direction and position of the straight line to be detected are determined according to the candidate straight line.

The electronic device determines the direction and position of the straight line to be detected according to the candidate straight line.

This step may include the following several sub-steps.

Firstly, using the candidate straight line as a central axis, a rectangular region having a predetermined size is generated.

The electronic device generates the rectangular region having the predetermined size by using the candidate straight line as the central axis. Referring to FIG. 2C, two points O and P may be selected on the candidate straight line, the length of the line segment OP is the length of the rectangular region. In practical applications, the length of the line segment OP should be selected as long as possible. Thereafter, vertical line segments AB and CD that respectively pass through the two points O and P of the candidate straight line are made, wherein the point O is a midpoint of the line segment AB and the point P is a midpoint of the line segment CD. Lengths of the line segments AB and CD are widths of the rectangle region. In practical applications, the lengths of the line segments AB and CD may be selected to be twice as the distance between the adjacent scan lines.

Secondly, on two sides of the rectangular region perpendicular to the candidate straight line, u points and v points are respectively selected, and every two points on the two sides are connected to obtain u*v line segments, wherein u≥1, v≥1.

In normal circumstances, u and v may be selected to be equal values, for example, u=v=8. At this time, 8*8=64 line segments may be obtained by connecting every two points on the two sides.

Thirdly, a matching distance of each line segment among the u*v line segments is respectively calculated.

The electronic device respectively calculates the matching distance of each line segment among the u*v line segments. The matching distance of the line segment is configured to reflect a degree of proximity of the line segment to the straight line to be detected. The smaller the matching distance of the line segment is, the more, as indicated, the line segment approaches the straight line to be detected; on the contrary, the greater the matching distance of the line segment is, the more, as indicated, the line segment offsets from the straight line to be detected.

Similar to the calculation of the matching distance of the scan line, for each line segment among the u*v line segments, several sample points are acquired by sampling on the line segment, a matching distance between a HOG feature set for each of the respective sample points and a template HOG feature set of the line segment in an actual direction is calculated, and matching distances of the n sample points are summed to obtain the matching distance of the line segment. The template HOG feature set of the line segment in the actual direction may allocate sizes of respective HOG features in the template HOG feature set according to projection distances of the line segment in K directions by adding weights.

Fourthly, a straight line with a line segment having a minimum matching distance is selected as the straight line to be detected.

After calculating the matching distances of the respective line segments, the electronic device selects the straight line with the line segment having the minimum matching distance as the straight line to be detected.

Furthermore, if it is allowable within the calculating and processing probability of the electronic device, the electronic device may select greater values of u and v, so as to determine the direction and the position of the straight line to be detected more precisely.

In the above-described step 201 through step 207, the detection of the straight line in the image is introduced in detail. Compared to the related method for detecting a straight line in the Background, the method for detecting the straight line provided by the present embodiment neither uses Hough Transform nor binarizes the image, thus avoids the errors caused by binarization, and increases the accuracy of the detection of straight line. Hereinafter, how to detect the rectangle in the image on the basis of the method for detecting the straight line provided by the present embodiment will be introduced in detail.

In step 208, for any straight line to be detected, whether a second straight line to be detected that meets a first predetermined condition exists in the image is detected.

For any straight line to be detected, the electronic device detects whether the second straight line to be detected that meets the first predetermined condition exists in the image. The method used by the electronic device to detect and acquire the second straight line to be detected from the image may refer to the method for detecting the straight line involved in the step 201 to the step 207. After the second straight line to be detected is detected and acquired, whether each of the second straight lines to be detected meets the first predetermined condition is continued to be detected. The first predetermined condition includes that the second straight line to be detected and the straight line to be detected have an intersection point within the image and an angle smaller than an angle threshold value.

An angle between two straight lines may be calculated using the following formula: angle θ=|arctan($a_{L1}$)−arctan($a_{L2}$)|, wherein $a_{L1}$ and $a_{L2}$ are respectively slopes of a straight line L1 and a straight line L2. The angle threshold value may be coarsely set, which is for example, 3 radians.

In step 209, if the second straight line to be detected that meets the first predetermined condition exists, the second straight line to be detected is added to a candidate straight line set.

If a detection result is that the second straight line to be detected that meets the first predetermined condition exists, the electronic device adds the second straight line to be detected to the candidate straight line set of the straight line to be detected. The candidate straight line set of the straight line to be detected includes all of the second straight lines to be detected that meet the first predetermined condition.

In step 210, for any two of the second straight lines to be detected in the candidate straight line set, whether a third straight line to be detected that meets a second predetermined condition exists is detected.

For any two of the second straight lines to be detected in the candidate straight line set, the electronic device detects whether the third straight line to be detected that meets the second predetermined condition exists. The second predetermined condition includes that the third straight line to be detected is different from the straight line to be detected, and the third straight line to be detected intersects both of the two second straight lines to be detected with two intersection points both within the image.

In step 211, if the third straight line to be detected that meets the second predetermined condition exists, a quadrilateral composed of the straight line to be detected, the two second straight lines to be detected and the third straight line to be detected are added to a candidate rectangle set.

If a detection result is that the third straight line to be detected that meets the second predetermined condition exists, the quadrilateral composed of the straight line to be detected, the electronic device adds a quadrilateral composed of the straight line to be detected, the two second straight lines to be detected and the third straight line to be detected to the candidate rectangle set. The candidate rectangle set comprises all quadrilaterals that are likely to become rectangles to be detected.

In step 212, for each quadrilateral in the candidate rectangle set, a matching distance of the quadrilateral is calculated.

For each quadrilateral in the candidate rectangle set, the electronic device calculates the matching distance of the rectangle. The matching distance of the quadrilateral is configured to reflect a degree of proximity of the quadrilateral to a rectangle to be detected, and the smaller the matching distance of the rectangle is, the more, as indicated, the rectangle approaches the rectangle to be detected, on the contrast, the greater the matching distance of the rectangle is, the more, as indicated, the rectangle offsets from the rectangle to be detected.

The matching distance of the rectangle is equal to a sum of matching distances of line segments corresponding to four sides of the rectangle. The matching distance of the line segment corresponding to any side of the rectangle may refer to the method in the third sub-step in the above-descried step 207, which will not be described repeatedly herein.

In step 213, a rectangle having a minimum matching distance or a matching distance smaller than a matching threshold value is determined as the rectangle to be detected.

The electronic device determines the rectangle having the minimum matching distance or the matching distance smaller than the matching threshold value as the rectangle to be detected.

In conclusion, the method for detecting the straight line provided by the present embodiment includes acquiring the HOG feature set of each respective pixel point in the image, determining the at least one candidate direction of the straight line to be detected according to the HOG feature sets of the respective pixel points, and then determining the direction and precise position of the straight line to be detected according to the candidate direction, wherein the HOG feature set is configured to reflect the straight line characteristics of the localized portion where the pixel point locates. The problem in the related art that the method for detecting the straight line may cause the straight line to be broken and the detection result to be inaccurate when the edge strength is weak or when there are noise interferences is solved. Compared with the related method for detecting a straight line in the Background, the method for detecting the straight line provided by the present embodiment neither uses Hough Transform nor binarizes the image, thus avoids the errors caused by binarization, and increases the accuracy of the detection of straight line.

In addition, the present embodiment further provides a method for detecting a rectangle on the basis of the detection of the straight line. After all quadrilaterals that are likely to become the rectangles to be detected are constructed, by calculating the matching distances of the respective quadrilaterals respectively, and determining the quadrilateral having the minimum matching distance or the matching distance smaller than the matching threshold value as the rectangle to be detected, the detection of a rectangle shape such as a card, a receipt or a book in the image is realized, and the actual application range of the method for detecting the straight line and the method for detecting the rectangle provided by the present disclosure is broadened.

The following are apparatus embodiments of the present disclosure, which may be configured to execute the method embodiments of the present disclosure. For the details not disclosed in the apparatus embodiments of the present disclosure, please refer to the method embodiments of the present disclosure.

Figure 3:
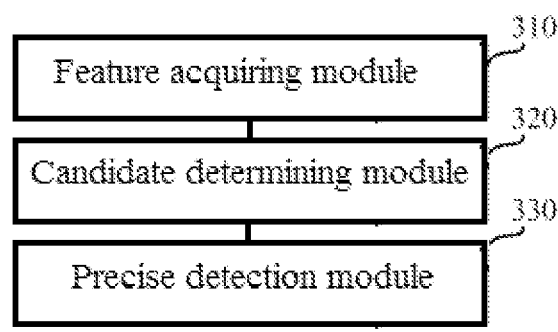
FIG. 3 is a diagram illustrating an apparatus for detecting a straight line, according to an exemplary embodiment.

FIG. 3 is a diagram illustrating an apparatus for detecting a straight line, according to an exemplary embodiment. The apparatus for detecting the straight line may be implemented to be all or a part of an electronic device by software, hardware or a combination thereof. The apparatus for detecting the straight line may include a feature acquiring module 310, a candidate determining module 320 and a precise detection module 330.

The feature acquiring module 310 is configured to acquire a Histogram of Oriented Gradients (HOG) feature set of each respective pixel point in an image, wherein the HOG feature set is configured to reflect straight line characteristics of a localized portion where the pixel point locates.

The candidate determining module 320 is configured to determine at least one candidate direction of a straight line to be detected according to the HOG feature sets of the respective pixel points.

The precise detection module 330 is configured to determine a direction and a position of the straight line to be detected precisely according to the at least one candidate direction.

In conclusion, the apparatus for detecting the straight line provided by the present embodiment includes acquiring the HOG feature set of each respective pixel point in the image, determining the at least one candidate direction of the straight line to be detected according to the HOG feature sets of the respective pixel points, and then determining the direction and precise position of the straight line to be detected according to the candidate direction, wherein the HOG feature set is configured to reflect the straight line characteristics of the localized portion where the pixel point locates. The problem in the related art that the method for detecting the straight line may cause the straight line to be broken and the detection result to be inaccurate when the edge strength is weak or when there are noise interferences is solved. Compared with the related method for detecting a straight line in the Background, the method for detecting the straight line provided by the present embodiment neither uses Hough Transform nor binarizes the image, thus avoids the errors caused by binarization, and increases the accuracy of the detection of straight line.

Figure 4:
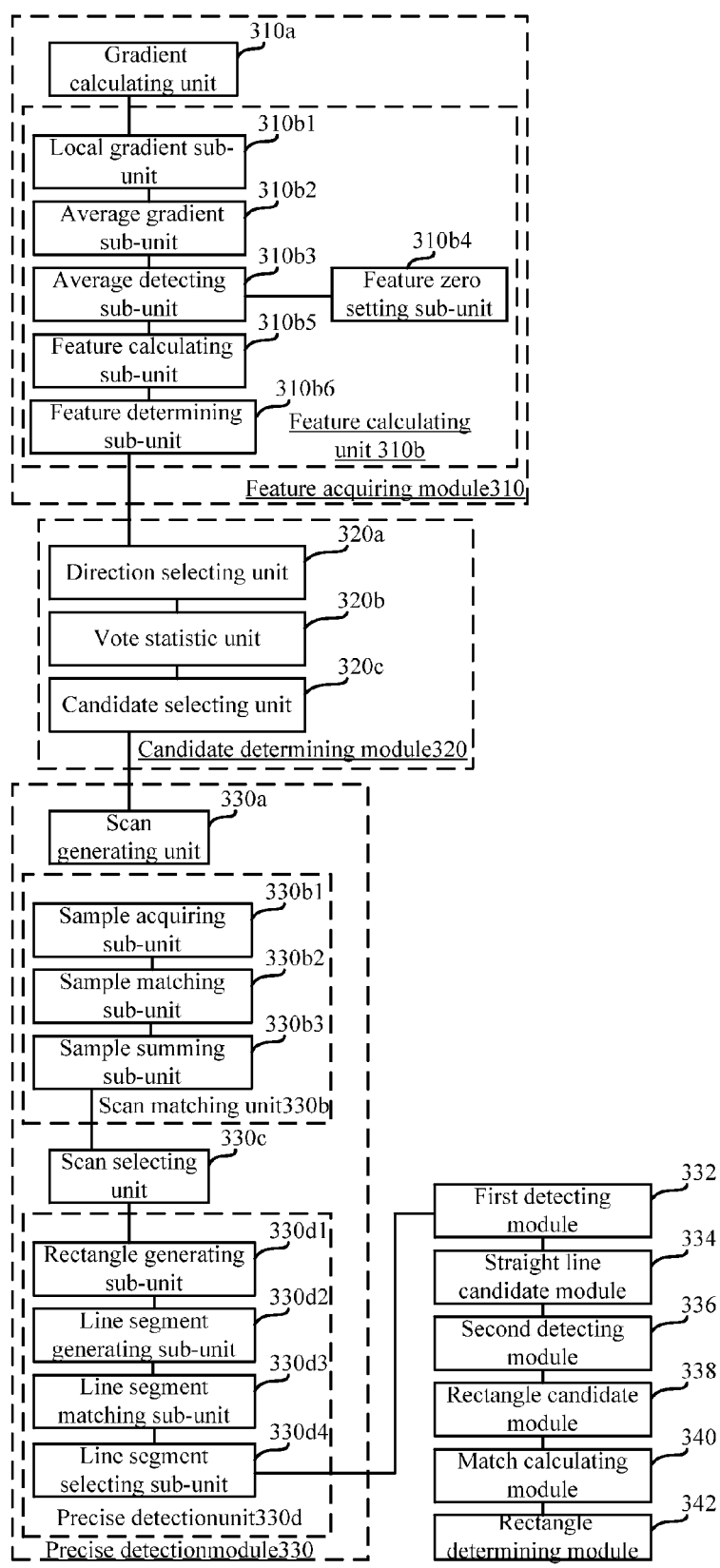
FIG. 4 is a diagram illustrating an apparatus for detecting a straight line, according to another exemplary embodiment.

FIG. 4 is a diagram illustrating an apparatus for detecting a straight line, according to another exemplary embodiment. The apparatus for detecting the straight line may be implemented to be all or a part of an electronic device by software, hardware or a combination thereof. The apparatus for detecting the straight line may include a feature acquiring module 310, a candidate determining module 320, a precise detection module 330, a first detecting module 332, a straight line candidate module 334, a second detecting module 336, a rectangle candidate module 338, a match calculating module 340 and a rectangle determining module 342.

The feature acquiring module 310 is configured to acquire a HOG feature set of each respective pixel point in an image, wherein the HOG feature set is configured to reflect straight line characteristics of a localized portion where the pixel point locates.

The feature acquiring module 310 includes a gradient calculating unit 310a and a feature calculating unit 310b.

The gradient calculating unit 310a is configured to, for each pixel point (i, j) of the respective pixel points, calculate an oriented gradient set g(i, j) of the pixel point, wherein the oriented gradient set g(i, j) includes oriented gradient values of the pixel point in K directions. The oriented gradient value of the pixel point in any direction refers to an absolute value of a difference between a gray value of the pixel point and a gray value of an adjacent pixel point in the direction, wherein K≥2.

The feature calculating unit 310b is configured to calculate a HOG feature set h(i, j) of the pixel point according to the oriented gradient set g(i, j) of the pixel point.

The feature calculating unit 310b includes a local gradient sub-unit 310b1, an average gradient sub-unit 310b2, an average detecting sub-unit 310b3, a feature setting sub-unit 310b4, a feature calculating sub-unit 310b5 and a feature determining sub-unit 310b6.

The local gradient sub-unit 310b1 is configured to respectively calculate local gradient values $\overline{h_k(i,j)}$ of the pixel point in the K directions, wherein a local gradient value $\overline{h_k(i,j)}$ in k direction is equal to a sum of the oriented gradient values of all pixel points in the k direction within the localized portion where the pixel point locates, and wherein k represents a direction.

The average gradient sub-unit 310b2 is configured to calculate an average gradient value $h_{norm}(i, j)$ of the pixel point, wherein the average gradient value $h_{norm}(i, j)$ is equal to the square root of the sum of the squares (SRSS) of the respective local gradient values $\overline{h_k(i,j)}$ of the pixel point.

The average detecting sub-unit 310b3 is configured to, for each pixel point (i, j) of the respective pixel points, detect whether the average gradient value $h_{norm}(i, j)$ is smaller than a predetermined average value $T_{norm}$.

The feature setting sub-unit 310b4 is configured to set the respective HOG features in the HOG feature set h(i, j) of the pixel point to zero, if a detection result is that the average gradient value $h_{norm}(i, j)$ is smaller than the predetermined average value $T_{norm}$.

The feature calculating sub-unit 310b5 is configured to divide the local gradient value $\overline{h_k(i,j)}$ by the average gradient value $h_{norm}(i, j)$ to obtain a HOG feature $h_k(i, j)$ of the pixel point in the k direction.

The feature determining sub-unit 310b6 is configured to determine a set of HOG features in the K directions as the HOG feature set h(i, j) of the pixel point.

The candidate determining module 320 is configured to determine at least one candidate direction of the straight line to be detected according to the HOG feature sets of the respective pixel points.

The candidate determining module 320 includes a direction selecting unit 320a, a vote statistic unit 320b and a candidate selecting unit 320c.

The direction selecting unit 320a is configured to, for each respective pixel point, select a direction corresponding to a HOG feature having a maximum value in the HOG feature set as a main direction of the localized portion where the pixel point locates.

The vote statistic unit 320b is configured to analyze statistics of vote numbers of the main directions of the localized portions where the respective pixel points locate in the K directions.

The candidate selecting unit 320c is configured to select a direction perpendicular to a direction having a vote number that exceeds a vote threshold as a candidate direction of the straight line to be detected.

The precise detection module 330 is configured to determine the direction and the position of the straight line to be detected according to the candidate direction.

The precise detection module 330 includes a scan generating unit 330a, a scan matching unit 330b, a scan selecting unit 330c and a precise detection unit 330d.

The scan generating unit 330a is configured to, for each of the candidate directions, generate at least one scan line parallel to the candidate direction.

The scan matching unit 330b is configured to respectively calculate a matching distance of each scan line, wherein the matching distance of the scan line is configured to reflect a degree of proximity of the scan line to the straight line to be detected.

The scan matching unit 330b includes a sample acquiring sub-unit 330b1, a sample matching sub-unit 330b2 and a sample summing sub-unit 330b3.

The sample acquiring sub-unit 330b1 is configured to, for each of the scan lines, acquiring n sample points by sampling on the scan line, wherein n≥1.

The sample matching sub-unit 330b2 is configured to calculate a matching distance between a HOG feature set for each of the respective sample points and a template HOG feature set in a direction perpendicular to the candidate direction.

The sample summing sub-unit 330b3 is configured to sum matching distances of the n sample points to obtain the matching distance of the scan line.

The scan selecting unit 330c is configured to select the scan line having a minimum matching distance as a candidate straight line.

The precise detection unit 330d is configured to determine the direction and the position of the straight line to be detected according to the candidate straight line.

The precise detection unit 330d includes a rectangle generating sub-unit 330d1, a line segment generating sub-unit 330d2, a line segment matching sub-unit 330d3 and a line segment selecting sub-unit 330d4.

The rectangle generating sub-unit 330d1 is configured to generate a rectangular region having a predetermined size by using the candidate straight line as a central axis.

The line segment generating sub-unit 330d2 is configured to respectively select u points and v points on two sides of the rectangular region perpendicular to the candidate straight line, and connect every two points on the two sides to obtain u*v line segments, wherein u≥1, v≥1.

The line segment matching sub-unit 330d3 is configured to respectively calculate a matching distance of each line segment among the u*v line segments, wherein the matching distance of the line segment is configured to reflect a degree of proximity of the line segment to the straight line to be detected.

The line segment selecting sub-unit 330d4 is configured to select a straight line with a line segment having a minimum matching distance as the straight line to be detected.

The first detecting module 332 is configured to, for any straight line to be detected, detect whether a second straight line to be detected that meets a first predetermined condition exists in the image, wherein the first predetermined condition includes that the second straight line to be detected and the straight line to be detected have an intersection point within the image and an angle smaller than an angle threshold value.

The straight line candidate module 334 is configured to add the second straight line to be detected to a candidate straight line set, if the second straight line to be detected that meets the first predetermined condition exists.

The second detecting module 336 is configured to, for any two of the second straight lines to be detected in the candidate straight line set, detect whether a third straight line to be detected that meets a second predetermined condition exists, wherein the second predetermined condition includes that the third straight line to be detected is different from the straight line to be detected, and the third straight line to be detected intersects both of the two second straight lines to be detected with two intersection points both within the image.

The rectangle candidate module 338 is configured to add a quadrilateral composed of the straight line to be detected, the two second straight lines to be detected and the third straight line to be detected to a candidate rectangle set, if the third straight line to be detected that meets the second predetermined condition exists.

The match calculating module 340 is configured to, for each quadrilateral in the candidate rectangle set, calculate a matching distance of the rectangle, wherein the matching distance of the quadrilateral is configured to reflect a degree of proximity of the quadrilateral to a rectangle to be detected, and the matching distance of the quadrilateral is equal to a sum of matching distances of line segments corresponding to four sides of the quadrilateral.

The rectangle determining module 342 is configured to determine a quadrilateral having a minimum matching distance or a matching distance smaller than a matching threshold value as the rectangle to be detected.

In conclusion, the apparatus for detecting the straight line provided by the present embodiment includes acquiring the HOG feature set of each respective pixel point in the image, determining the at least one candidate direction of the straight line to be detected according to the HOG feature sets of the respective pixel points, and then determining the direction and precise position of the straight line to be detected according to the candidate direction, wherein the HOG feature set is configured to reflect the straight line characteristics of the localized portion where the pixel point locates. The problem in the related art that the method for detecting the straight line may cause the straight line to be broken and the detection result to be inaccurate when the edge strength is weak or when there are noise interferences is solved. Moreover, the method for detecting the straight line provided by the present embodiment neither uses Hough Transform nor binarizes the image, thus avoids the errors caused by binarization, and increases the accuracy of the detection of straight line.

In addition, the present embodiment further provides an apparatus for detecting a rectangle on the basis of the detection of the straight line. After all quadrilaterals that are likely to become the rectangles to be detected are constructed, by calculating the matching distances of the respective quadrilaterals respectively, and determining the quadrilateral having the minimum matching distance or the matching distance smaller than the matching threshold value as the rectangle to be detected, the detection of a rectangle shape such as a card, a receipt or a book in the image is realized, and the actual application range of the device for detecting the straight line and the device for detecting the rectangle provided by the present disclosure is broadened.

It is to be explained that when the apparatus for detecting the straight line provided in the above embodiments detects the straight line in the image, the division of the modules with functions as above is described only for illustration. In actual applications, the above functions may be implemented by different modules as needed. That is, the internal structure of the apparatus is divided into different modules, to realize all or a part of the above-described functions. In addition, the apparatuses for detecting the straight line provided by the above embodiments belong to the same inventive concept as that of the embodiments for the methods for detecting the straight line, and the specific implementing processes thereof may be found in the embodiments of the methods, which are not described repeatedly.

Figure 5:
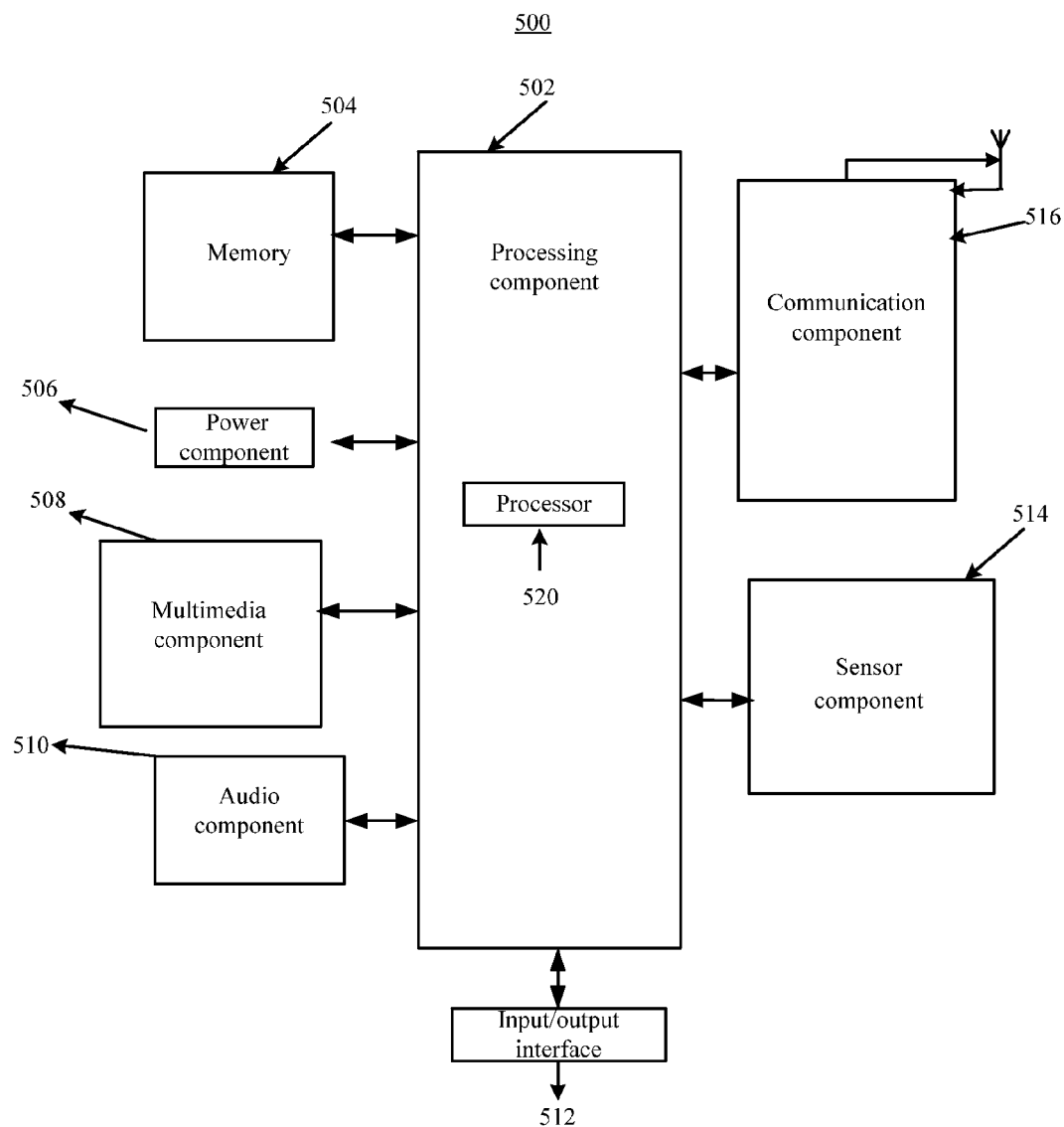
FIG. 5 is a block diagram illustrating a device for detecting a straight line, according to an exemplary embodiment.

FIG. 5 is a block diagram of an electronic device 500, which is configured to detect a straight line, according to an exemplary embodiment. For example, the electronic device 500 may be a mobile phone, a computer, a digital broadcast terminal, a messaging device, a gaming console, a tablet, a medical device, exercise equipment, a personal digital assistant and the like.

Referring to FIG. 5, the electronic device 500 may include one or more of the following components: a processing component 502, a memory 504, a power component 506, a multimedia component 508, an audio component 510, an input/output (I/O) interface 512, a sensor component 514, and a communication component 516.

The processing component 502 usually controls overall operations of the electronic device 500, such as the operations associated with display, telephone calls, data communications, camera operations, and recording operations. The processing component 502 may include one or more processors 520 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the electronic device 500. Examples of such data include instructions for any application or method operated on the electronic device 500, contact data, phonebook data, messages, pictures, videos, etc. The memory 504 may be implemented using any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the electronic device 500. The power component 506 may include a power management system, one or more power sources, and other components associated with the generation, management, and distribution of power in the electronic device 500.

The multimedia component 508 includes a screen providing an output interface between the electronic device 500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 508 includes a front camera and/or a rear camera. The front camera and/or the rear camera may receive an external multimedia datum while the electronic device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone ("MIC") configured to receive an external audio signal when the electronic device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals.

The I/O interface 512 provides an interface between the processing component 502 and peripheral interface modules, such as a keyboard, a click wheel, a button, and the like. The button may include, but not limited to, a home button, a volume button, a starting button, and a locking button.

The sensor component 514 includes one or more sensors to provide status assessments of various aspects of the electronic device 500. For instance, the sensor component 514 may detect an open/closed status of the electronic device 500, relative positioning of components, e.g., the display and the keyboard, of the electronic device 500, a change in position of the electronic device 500 or a component of the electronic device 500, a presence or absence of user contact with the electronic device 500, an orientation or an acceleration/deceleration of the electronic device 500, and a change in temperature of the electronic device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the electronic device 500 and other devices. The electronic device 500 can access a wireless network based on a communication standard, such as WiFi, 2G, or 3G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the electronic device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 504, executable by the processor 820 in the electronic device 500, for performing the above-described methods. For example, the non-transitory computer-readable storage medium may be a ROM, a random access memory (RAM), a CD-ROM, a magnetic tape, a floppy disc, an optical data storage device, and the like.

A non-transitory computer readable storage medium, when instructions in the storage medium are executed by the processor of the electronic device 500, the electronic device 500 can execute a method for detecting a straight line, the method includes: acquiring a Histogram of Oriented Gradients (HOG) feature set of each respective pixel point in an image, wherein the HOG feature set is configured to reflect straight line characteristics of a localized portion where the pixel point locates; determining at least one candidate direction of a straight line to be detected according to the HOG feature sets of the respective pixel points; and determining a direction and a position of the straight line precisely according to the at least one candidate direction.

In conclusion, the electronic device for detecting the straight line provided by the present embodiment includes acquiring the HOG feature set of each respective pixel point in the image, determining the at least one candidate direction of the straight line to be detected according to the HOG feature sets of the respective pixel points, and then determining the direction and precise position of the straight line to be detected according to the candidate direction, wherein the HOG feature set is configured to reflect the straight line characteristics of the localized portion where the pixel point locates. The problem in the related art that the method for detecting the straight line may cause the straight line to be broken and the detection result to be inaccurate when the edge strength is weak or when there are noise interferences is solved. Moreover, the method for detecting the straight line provided by the present embodiment neither uses Hough Transform nor binarizes the image, thus avoids the errors caused by binarization, and increases the accuracy of the detection of straight line.

In addition, the electronic device according to the present disclosure may typically be various handheld terminal devices, such as a mobile phone, a personal digital assistant (PDA) and the like. Therefore, the scope of the present disclosure is not limited to a particular type of electronic device.

Additionally, the method according to the present disclosure may be implemented as the computer program executed by CPU, and the computer program may be stored in the computer-readable storage medium. When the computer program is executed by the CPU, the above functions defined in the methods of the present disclosure are performed.

In addition, the above steps of the methods and the units of the system may also be implemented with a controller and a computer-readable storage device which stores computer programs that cause the controller to realize the above steps and functions of the units.

In addition, it should be appreciated that the above mentioned computer-readable storage device (such as storage) may be a volatile memory or a nonvolatile memory, or may include the both. For example, but without limitation, the nonvolatile memory may include a read only memory (ROM), a programmable ROM (PROM), an electrically programmable ROM (EPROM), an electrically erasable programmable ROM (EEPROM), or a flash memory. The volatile memory may include a random access memory (RAM) which may serve as an external cache RAM memory. As an example, but without limitation, the RAM may be of various forms, such as a synchronous RAM (DRAM), a dynamic RAM (DRAM), a synchronous DRAM (SDRAM), a double data rate SDRAM (DDR SDRAM), an enhanced SDRAM (ESDRAM), a synchronous link DRAM (SLDRAM) and a direct Rambus RAM (DRRAM). The storage device according to the disclosed aspects is intended to include but not limited to these and other suitable types of memories.

It should be appreciated by those skilled in the art that, various exemplary logical blocks, modules, circuits, and algorithm steps described in conjunction with the present disclosure may be implemented as electronic hardware, computer software or combination of both. In order to clearly illustrate the interchangeability between the hardware and the software, a general description has been given to various illustrative components, blocks, modules, circuits and functions of steps. Whether such functions will be implemented as software or hardware depends on the particular application and the restriction from the design of the whole system. Those functions may be realized in various means for each of the particular application by those skilled in the art without departing the scope of the present disclosure.

Various illustrative logical blocks, modules and circuits described in conjunction with the present disclosure may be implemented or performed by the following components that are designed to perform the above functions: a general purpose processor, a digital signal processor (DSP), a dedicated integrated circuit (ASIC), a field programmable gate array (FPGA) or other programmable logic devices, discrete gates or transistor logics, discrete hardware components or any combination of these components. The general purpose processor may be a microprocessor. Alternatively, the processor may be any one of a conventional processor, a controller, a microcontroller, or a state machine. The processor may be implemented as combination of computing devices, such as combination of a DSP and a microprocessor, a plurality of microprocessors, one or more microprocessors in conjunction with a DSP core, or any other such configuration.

The method and steps of the algorithm described in conjunction with the present disclosure may be directly contained in hardware, in a software module executed by a processor or in combination of the both. The software module may reside in a RAM memory, a flash memory, a ROM memory, an EPROM memory, an EEPROM memory, a registers, a hard disk, a removable disk, a CD-ROM, or any other storage medium known in the art. An exemplary storage medium is coupled to the processor such that the processor can read information from the storage medium or write information thereto. In an alternative embodiment, the storage medium may be integrated with the processor. The processor and the storage medium may reside in an ASIC which may reside in a user terminal. In an alternative embodiment, the processor and the storage medium may reside in a user terminal as discrete components.

In one or more exemplary designs, the above functions may be implemented in hardware, software, firmware, or any combination thereof. If implemented in software, the above functions may be stored in a computer readable medium as one or more instructions or codes, or transmitted through the computer readable medium. The computer readable medium includes computer storage medium and communication medium. The communication media includes any medium that may be used to transmit computer programs from one location to another location. The storage medium may be any available medium that is accessible by a general or special computer. For example, but without limitation, the computer readable medium may include a RAM, a ROM, an EEPROM, a CD-ROM or other CD storage devices, disk storage device or other magnetic storage devices, or any other medium that may be used to carry or store the required program codes in a form of instructions or data structure and may be accessible by a general or special computer or a general or special processor. In addition, any connection may be appropriately called as a computer-readable medium. For example, if a coaxial cable, a fiber optic cable, a twisted pair, a digital subscriber line (DSL) or wireless technologies such as infrared rays, radio and microwave are used to transmit software from a website, a server or other remote source, the above coaxial cable, the fiber optic cable, the twisted pair, the DSL or wireless technologies such as infrared rays, radio and microwave are all within the definition of the medium. As used herein, the disk and the optical disk includes a compression disk (CD), a laser disc, an optical disk, a digital versatile disc (DVD), a floppy disks, a blue-ray disk, among which the magnetic disk normally represents data magnetically, and the optical disk represents data optically by utilizing a laser. The combination of the above contents should also be included in the scope of the computer readable medium.

Although the exemplary embodiments of the present disclosure has been illustrated in the above contents, it should be noted that, various variations and modifications may be made without departing from the scope of the present disclosure that is defined by the claims. The functions, steps and/or operations of the method claims according to the described embodiments of the present disclosure, may not necessarily be performed in a particular order. In addition, although elements of the present disclosure may be described or prescribed in a single form, multiple forms may also be devised, unless the single form is explicitly prescribed.

The numbers of the above embodiments of the present disclosure are only for description, but not represent the advantages and disadvantages of the embodiments.

Those skilled in the art may understand, the whole or part of the steps in the above embodiments may be achieved by hardware, or may be achieved by the relevant hardware which are instructed by using programs. The program may be stored in a computer readable storage medium, and the storage medium may be a read only storage, a magnetic disk or an optical disk, etc.

The above contents are only the embodiments of the present disclosure, which are not used to limit the present disclosure. Any changes, equal substitution and modifications, etc. within the concept and principle of the present disclosure should be included in the protection scope of the present disclosure.

What is claimed is:

1. A method for detecting a straight line, comprising:
   acquiring a Histogram of Oriented Gradients (HOG) feature set for each respective pixel point in an image, wherein the HOG feature set is configured to reflect straight line characteristics of a localized portion where the pixel point locates;
   determining at least one candidate direction of a straight line to be detected according to the HOG feature sets of the respective pixel points;
   generating at least one scan line paralleled to the candidate direction for each of the candidate directions;
   calculating a matching distance of each scan line respectively, wherein the matching distance of the scan line is configured to reflect a degree of proximity of the scan line to the straight line to be detected;
   selecting the scan line having a minimum matching distance as a candidate straight line; and
   detecting the direction and the position of the straight line to be detected according to the candidate straight line.

2. The method according to claim 1, wherein acquiring the HOG feature set for each respective pixel point comprises:
   calculating an oriented gradient set $g(i, j)$ of the pixel point, for each respective pixel point $(i, j)$, wherein the oriented gradient set $g(i, j)$ includes oriented gradient values of the pixel point in K directions, and an oriented gradient value of the pixel point in any direction refers to an absolute value of a difference between a gray value of the pixel point and a gray value of an adjacent pixel point in the direction, wherein $K \geq 2$; and
   calculating a HOG feature set $h(i, j)$ of the pixel point according to the oriented gradient set $g(i, j)$ of the pixel point.

3. The method according to claim 2, wherein calculating the HOG feature set $h(i, j)$ of the pixel point according to the oriented gradient set $g(i, j)$ of the pixel point comprises:
   calculating local gradient values $\overline{h_k(i,j)}$ of the pixel point in the K directions respectively, wherein a local gradient value $\overline{h_k(i,j)}$ in a k direction is equal to a sum of the oriented gradient values of all pixel points within the localized portion where the pixel point locates in the k direction;
   calculating an average gradient value $h_{norm}(i, j)$ of the pixel point, wherein the average gradient value $h_{norm}(i, j)$ is equal to the square root of the sum of the squares (SRSS) of the respective local gradient values $\overline{h_k(i,j)}$ of the pixel point;
   dividing the local gradient value $\overline{h_k(i,j)}$ by the average gradient value $h_{norm}(i, j)$ to obtain a HOG feature $h_k(i, j)$ of the pixel point in the k direction; and
   determining a set of HOG features in the K directions as the HOG feature set $h(i, j)$ of the pixel point.

4. The method according to claim 3, wherein the method further comprises:
   detecting whether the average gradient value $h_{norm}(i, j)$ is smaller than a predetermined average value $T_{norm}$ for each respective pixel point $(i, j)$; and
   setting the respective HOG features in the HOG feature set $h(i, j)$ of the pixel point to zero, if the average gradient value $h_{norm}(i, j)$ is detected to be smaller than the predetermined average value $T_{norm}$.

5. The method according to claim 2, wherein determining the at least one candidate direction of the straight line to be detected according to the HOG feature sets of the respective pixel points comprises:
   selecting a direction corresponding to a HOG feature having a maximum value in the HOG feature set as a main direction of the localized portion where the pixel point locates;
   analyzing statistics of vote numbers of the main directions of the localized portions where the respective pixel points locate in the K directions; and
   selecting a direction perpendicular to a direction having a vote number that exceeds a vote threshold as a candidate direction of the straight line to be detected.

6. The method according to claim 1, wherein calculating the matching distance of each scan line respectively comprises:
   acquiring n sample points by sampling on the scan line for each of the scan lines, wherein $n \geq 1$;
   calculating a matching distance between a HOG feature set for each of the respective sample points and a template HOG feature set in a direction perpendicular to the candidate direction; and
   summing matching distances of the n sample points to obtain the matching distance of the scan line.

7. The method according to claim 1, wherein detecting the direction and the position of the straight line according to the candidate straight line comprises:
   generating a rectangular region having a predetermined size by using the candidate straight line as a central axis;
   selecting u points and v points respectively on two sides of the rectangular region perpendicular to the candidate straight line, and connecting every two points on the two sides to obtain u*v line segments, wherein $u \geq 1$, $v \geq 1$;
   calculating a matching distance of each line segment respectively among the u*v line segments, wherein the matching distance of the line segment is configured to reflect a degree of proximity of the line segment to the straight line to be detected; and
   selecting a straight line with a line segment having a minimum matching distance as the straight line to be detected.

8. The method according to claim 1, wherein the method further comprises:
   detecting whether a second straight line to be detected that meets a first predetermined condition exists for any straight line to be detected in the image, wherein the first predetermined condition includes that the second straight line to be detected and the straight line to be detected have an intersecting point within the image and an angle smaller than an angle threshold value;
   adding the second straight line to be detected to a candidate straight line set if the second straight line to be detected that meets the first predetermined condition exists;
   detecting whether a third straight line to be detected that meets a second predetermined condition exists for any two of the second straight lines to be detected in the candidate straight line set, wherein the second predetermined condition includes that the third straight line to be detected is different from the straight line to be detected, and the third straight line to be detected intersects both of the two second straight lines to be detected with two intersection points both within the image;

adding a quadrilateral composed of the straight line to be detected, the two second straight lines to be detected and the third straight line to be detected to a candidate rectangle set, if the third straight line to be detected that meets the second predetermined condition exists;

calculating a matching distance of the quadrilateral for each quadrilateral in the candidate rectangle set, wherein the matching distance of the quadrilateral is configured to reflect a degree of proximity of the quadrilateral to a rectangle to be detected, and the matching distance of the quadrilateral is equal to a sum of matching distances of line segments corresponding to four sides of the quadrilateral; and determining a quadrilateral having a minimum matching distance or a matching distance smaller than a matching threshold value as the rectangle to be detected.

9. A device for detecting a straight line, comprising:

a processor; and a memory for storing instructions executable by the processor, for performing:

acquiring a Histogram of Oriented Gradients (HOG) feature set for each respective pixel point in an image, wherein the HOG feature set is configured to reflect straight line characteristics of a localized portion where the pixel point locates;

determining at least one candidate direction of a straight line to be detected according to the HOG feature sets of the respective pixel points;

generating at least one scan line paralleled to the candidate direction for each of the candidate directions;

calculating a matching distance of each scan line respectively, wherein the matching distance of the scan line is configured to reflect a degree of proximity of the scan line to the straight line to be detected;

selecting the scan line having a minimum matching distance as a candidate straight line; and detecting the direction and the position of the straight line to be detected according to the candidate straight line.

10. The device according to claim 9, wherein acquiring the HOG feature set for each respective pixel points comprises:

calculating an oriented gradient set g(i, j) of the pixel point, for each respective pixel point (i, j), wherein the oriented gradient set g(i, j) includes oriented gradient values of the pixel point in K directions, and an oriented gradient value of the pixel point in any direction refers to an absolute value of a difference between a gray value of the pixel point and a gray value of an adjacent pixel point in the direction, wherein K≥2; and calculating a HOG feature set h(i, j) of the pixel point according to the oriented gradient set g(i, j) of the pixel point.

11. The device according to claim 10, wherein calculating the HOG feature set h(i, j) of the pixel point according to the oriented gradient set g(i, j) of the pixel point comprises:

calculating local gradient values $\overline{h_k(i,j)}$ of the pixel point in the K directions respectively, wherein a local gradient value $\overline{h_k(i,j)}$ in a k direction is equal to a sum of the oriented gradient values of all pixel points within the localized portion where the pixel point locates in the k direction;

calculating an average gradient value $h_{norm}(i, j)$ of the pixel point, wherein the average gradient value $h_{norm}(i, j)$ is equal to the square root of the sum of the squares (SRSS) of a sum of squares of the respective local gradient values $\overline{h_k(i,j)}$ of the pixel point;

dividing the local gradient value $\overline{h_k(i,j)}$ by the average gradient value $h_{norm}(i, j)$ to obtain a HOG feature $h_k(i, j)$ of the pixel point in the k direction; and determining a set of HOG features in the K directions as the HOG feature set h(i, j) of the pixel point.

12. The device according to claim 11, wherein the processor is further configured to performing:

detecting whether the average gradient value $h_{norm}(i, j)$ is smaller than a predetermined average value $T_{norm}$ for each respective pixel point (i, j); and setting the respective HOG features in the HOG feature set h(i, j) of the pixel point to zero, if the average gradient value $h_{norm}(i, j)$ is detected to be smaller than the predetermined average value $T_{norm}$.

13. The device according to claim 10, wherein determining the at least one candidate direction of the straight line to be detected according to the HOG feature sets of the respective pixel points comprises:

selecting a direction corresponding to a HOG feature having a maximum value in the HOG feature set as a main direction of the localized portion where the pixel point locates;

Analyzing statistics of vote numbers of the main directions of the localized portions where the respective pixel points locate in the K directions; and selecting a direction perpendicular to a direction having a vote number that exceeds a vote threshold as a candidate direction of the straight line to be detected.

14. The device according to claim 9, wherein calculating the matching distance of each scan line respectively comprises:

acquiring n sample points by sampling on the scan line for each of the scan lines, wherein n≥1;

calculating a matching distance between a HOG feature set for each of the respective sample points and a template HOG feature set in a direction perpendicular to the candidate direction; and summing matching distances of the n sample points to obtain the matching distance of the scan line.

15. The device according to claim 9, wherein detecting the direction and the position of the straight line according to the candidate straight line comprises:

generating a rectangular region having a predetermined size by using the candidate straight line as a central axis;

selecting u points and v points respectively on two sides of the rectangular region perpendicular to the candidate straight line, and connecting every two points on the two sides to obtain u*v line segments, wherein u≥1, v≥1;

calculating a matching distance of each line segment respectively among the u*v line segments, wherein the matching distance of the line segment is configured to reflect a degree of proximity of the line segment to the straight line to be detected; and selecting a straight line with a line segment having a minimum matching distance as the straight line to be detected.

16. The device according to claim 9, wherein the processor is further configured to perform:

detecting whether a second straight line to be detected that meets a first predetermined condition exists for any straight line to be detected in the image, wherein the first predetermined condition includes that the second straight line to be detected and the straight line to be detected have an intersecting point within the image and an angle smaller than an angle threshold value;

adding the second straight line to be detected to a candidate straight line set if the second straight line to be detected that meets the first predetermined condition exists;

detecting whether a third straight line to be detected that meets a second predetermined condition exists for any two of the second straight lines to be detected in the candidate straight line set, wherein the second predetermined condition includes that the third straight line to be detected is different from the straight line to be detected, and the third straight line to be detected intersects both of the two second straight lines to be detected with two intersection points both within the image;

adding a quadrilateral composed of the straight line to be detected, the two second straight lines to be detected and the third straight line to be detected to a candidate rectangle set, if the third straight line to be detected that meets the second predetermined condition exists;

calculating a matching distance of the quadrilateral for each quadrilateral in the candidate rectangle set, wherein the matching distance of the quadrilateral is configured to reflect a degree of proximity of the quadrilateral to a rectangle to be detected, and the matching distance of the quadrilateral is equal to a sum of matching distances of line segments corresponding to four sides of the quadrilateral; and determining a quadrilateral having a minimum matching distance or a matching distance smaller than a matching threshold value as the rectangle to be detected.

17. A non-transitory readable storage medium comprising instructions, executable by a processor in a device, for performing a method for detecting a straight line, wherein the method comprises:

acquiring a Histogram of Oriented Gradients (HOG) feature set for each respective pixel point in an image, wherein the HOG feature set is configured to reflect straight line characteristics of a localized portion where the pixel point locates;

determining at least one candidate direction of a straight line to be detected according to the HOG feature sets of the respective pixel points;

generating at least one scan line paralleled to the candidate direction for each of the candidate directions;

calculating a matching distance of each scan line respectively, wherein the matching distance of the scan line is configured to reflect a degree of proximity of the scan line to the straight line to be detected;

selecting the scan line having a minimum matching distance as a candidate straight line; and detecting the direction and the position of the straight line to be detected according to the candidate straight line.

* * * * *